United States Patent
Koenig et al.

(10) Patent No.: US 9,152,683 B2
(45) Date of Patent: Oct. 6, 2015

(54) DATABASE-TRANSPARENT NEAR ONLINE ARCHIVING AND RETRIEVAL OF DATA

(75) Inventors: Edgardo Gildo Koenig, Leimen (DE); Hans-Juergen Moldowan, Weinsberg (DE); Thomas Rech, Rittersheim (DE)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 12/898,252

(22) Filed: Oct. 5, 2010

(65) Prior Publication Data

US 2012/0084316 A1    Apr. 5, 2012

(51) Int. Cl.
*G06F 7/00* (2006.01)
*G06F 17/30* (2006.01)

(52) U.S. Cl.
CPC .... *G06F 17/30566* (2013.01); *G06F 17/30545* (2013.01); *G06F 17/30312* (2013.01)

(58) Field of Classification Search
USPC .................................. 707/999.102, 705, 694
See application file for complete search history.

(56) References Cited

U.S. PATENT DOCUMENTS

| | | | |
|---|---|---|---|
| 6,957,225 B1 * | 10/2005 | Zait et al. | 1/1 |
| 7,225,211 B1 | 5/2007 | Colgrove et al. | |
| 7,240,064 B2 * | 7/2007 | Risvik et al. | 707/709 |
| 7,287,048 B2 | 10/2007 | Bourbonnais et al. | |
| 7,487,171 B2 | 2/2009 | Hsu et al. | |
| 7,917,512 B2 * | 3/2011 | Bhide et al. | 707/737 |
| 2003/0229617 A1 * | 12/2003 | Rjaibi et al. | 707/1 |
| 2005/0102270 A1 * | 5/2005 | Risvik et al. | 707/2 |
| 2005/0256865 A1 * | 11/2005 | Ma et al. | 707/5 |
| 2006/0288022 A1 * | 12/2006 | Rjaibi et al. | 707/100 |
| 2007/0168336 A1 * | 7/2007 | Ransil et al. | 707/3 |
| 2007/0250475 A1 * | 10/2007 | Idei et al. | 707/2 |
| 2008/0294676 A1 * | 11/2008 | Faerber et al. | 707/102 |
| 2009/0144235 A1 * | 6/2009 | Bhide et al. | 707/3 |
| 2009/0144303 A1 * | 6/2009 | Bhide et al. | 707/101 |
| 2009/0210445 A1 | 8/2009 | Draese et al. | |
| 2010/0011031 A1 * | 1/2010 | Huang et al. | 707/202 |

OTHER PUBLICATIONS

Anonymous, "System and Method for Usage Aware Row Storage in Database Systems," ip.com Prior Art Database, Jul. 2010: pp. 1-4, <http://priorartdatabase.com/IPCOM/000197960>.

* cited by examiner

*Primary Examiner* — Hosain Alam
*Assistant Examiner* — Eliyah S Harper
(74) *Attorney, Agent, or Firm* — Patterson & Sheridan, LLP

(57) ABSTRACT

Method, program products and apparatus are disclosed for optimizing access to a data table. A value-existence structure is used to determine whether the data table contains rows for a given database query. The value-existence structure may be useful, for example, for managing transparent access to an online database and a nearline database.

18 Claims, 9 Drawing Sheets

FIG. 6

| EMPID | DEPT | JOB | YEARS |
|---|---|---|---|
| 10 | 10 | MGR | 15 |
| 20 | 10 | SALES | 5 |
| 30 | 30 | MGR | 5 |
| 40 | 10 | SALES | 5 |
| 50 | 5 | MGR | 10 |
| 60 | 30 | SALES | <null> |
| 70 | 30 | SALES | 10 |
| 80 | 10 | CLERK | <null> |
| 90 | 20 | SALES | 15 |
| 100 | 20 | MGR | 10 |

| VALUE | BITCHAIN |
|---|---|
| 10 | 1101 |
| 100 | 1000 |
| 15 | 0001 |
| 20 | 1100 |
| 30 | 1100 |
| 40 | 1000 |
| 5 | 0101 |
| 50 | 1000 |
| 60 | 1000 |
| 70 | 1000 |
| 80 | 1000 |
| 90 | 1000 |
| CLERK | 0010 |
| MGR | 0010 |
| <null> | 0001 |
| SALES | 0010 |

224a  224b  224

|   A)   | 222 |   |   |   |   |
|---|---|---|---|---|---|
| X | A | B | C | D | E |
| 0 |   |   |   |   |   |
| 0 |   |   |   |   |   |
| 0 |   |   |   |   |   |
| 0 |   |   |   |   |   |
| 0 |   |   |   |   |   |
| 0 |   |   |   |   |   |

|   B)   | 222 |   |   |   |   |
|---|---|---|---|---|---|
| X | A | B | C | D | E |
| 1 |   |   |   |   |   |
| 1 |   |   |   |   |   |
| 1 |   |   |   |   |   |
| 1 |   |   |   |   |   |
| 1 |   |   |   |   |   |
| 1 |   |   |   |   |   |

|   C)   | 222 |   |   |   |   |
|---|---|---|---|---|---|
| X | A | B | C | D | E |
| 1 |   |   |   |   |   |
| 0 |   |   |   |   |   |
| 0 |   |   |   |   |   |
| 0 |   |   |   |   |   |
| 0 |   |   |   |   |   |
| 1 |   |   |   |   |   |

FIG. 8

DATABASE-TRANSPARENT NEAR ONLINE ARCHIVING AND RETRIEVAL OF DATA

BACKGROUND

Today's businesses and organizations rely on an increasing amount of data to accomplish their goals. Storing, retrieving and maintaining data while fulfilling service level agreements (SLAs) is a main cost driver within IT operations.

One approach to address this issue is the concept of Near (on)line storage (also referred to as nearline or NLS), in which less frequently accessed data is stored on slower (but usually cheaper) media and frequently accessed data is stored on fast storage. With this concept fast access to frequently accessed data is provided, while retrieving less frequently accessed data with a reduced response time is accepted.

For example, currently NLS solutions for specific business applications exist, meaning that the logic of processing NLS data has been built into the specific application. This is true both for archiving aged data as well as for reading and/or modifying the data. Such solutions are typically bound to a certain application with a certain release level. However, these NLS solutions require the installation of new software to the enterprise landscape.

Another approach includes the use of Hierarchical Storage Management (HSM) solutions, in which data is automatically moved between high-cost (hard disk drive arrays) and low-cost storage media (i.e., optical discs or tapes). These solutions essentially work on a file level basis. Accordingly, these solutions may not be applied in an efficient manner to databases, because HSM does not support any granularity of the data movement.

SUMMARY

Accordingly, improved techniques for nearline data archiving and retrieval are needed, which also offer transparent access to both the online as well as to the nearline storage area. One embodiment of the invention includes a computer implemented method of managing access to a first data table. The method may generally include receiving a database query from a database client. The database query may itself include a command to search for one or more matching rows containing a given value in a given column. The method may also include verifying whether a value-existence structure contains the given value. The value-existence structure may provide a list of distinct values stored in the first data table. Each distinct value in the value-existence structure is associated a respective indicator identifying the columns of the first data table in which the distinct value is stored. Upon determining the value-existence structure contains the given value and the respective indicator indicates that the given value is stored in the given column, the matching rows are retrieved from the first data table containing the given value in the given column. This method may also include transmitting the matching rows of the first data table to the database client.

Still another embodiment of the invention includes a computer readable storage medium storing a program, which, when executed on a processor, performs an operation for managing access to a first data table. The operation itself may generally include receiving a database query from a database client. The database query may itself include a command to search for one or more matching rows containing a given value in a given column. The operation may also include verifying whether a value-existence structure contains the given value. The value-existence structure may provide a list of distinct values stored in the first data table. The database query itself may provide a command to search for matching rows containing a given value in a given column. The operation may further include determining whether a value-existence structure contains the given value, the value-existence structure comprising a list of distinct values stored in the first data table. Each distinct value in the value-existence structure is associated with a respective indicator identifying the columns of the first data table in which the distinct value is stored. Upon determining the value-existence structure contains the given value and the respective indicator indicates that the given value is stored in the given column, the matching rows are retrieved from the first data table containing the given value in the given column. The operation may also include transmitting the matching rows of the first data table to the database client.

Still another embodiment of the invention includes a system having a processor and a memory storing a database management system tool for managing access to a first data table, which when executed on the processor is configured to perform an operation. The operation itself may generally include receiving a database query from a database client. The database query may itself include a command to search for one or more matching rows containing a given value in a given column. The operation may also include verifying whether a value-existence structure contains the given value. The value-existence structure may provide a list of distinct values stored in the first data table. Each distinct value in the value-existence structure is associated with a respective indicator identifying the columns of the first data table in which the distinct value is stored. Upon determining the value-existence structure contains the given value and the respective indicator indicates that the given value is stored in the given column, the matching rows are retrieved from the first data table containing the given value in the given column. The operation may also include transmitting the matching rows of the first data table to the database client.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. Note, however, that the appended drawings illustrate only typical embodiments of this invention and are therefore not to be considered limiting of its scope, for the invention may admit to other equally effective embodiments.

FIGS. 5-7 show exemplary data structures which may be used in the database management system of FIG. 1.

FIGS. 8-10 show exemplary embodiments of data archiving mechanisms, which may be used in the database management system of FIG. 1.

DETAILED DESCRIPTION

Figure 1:
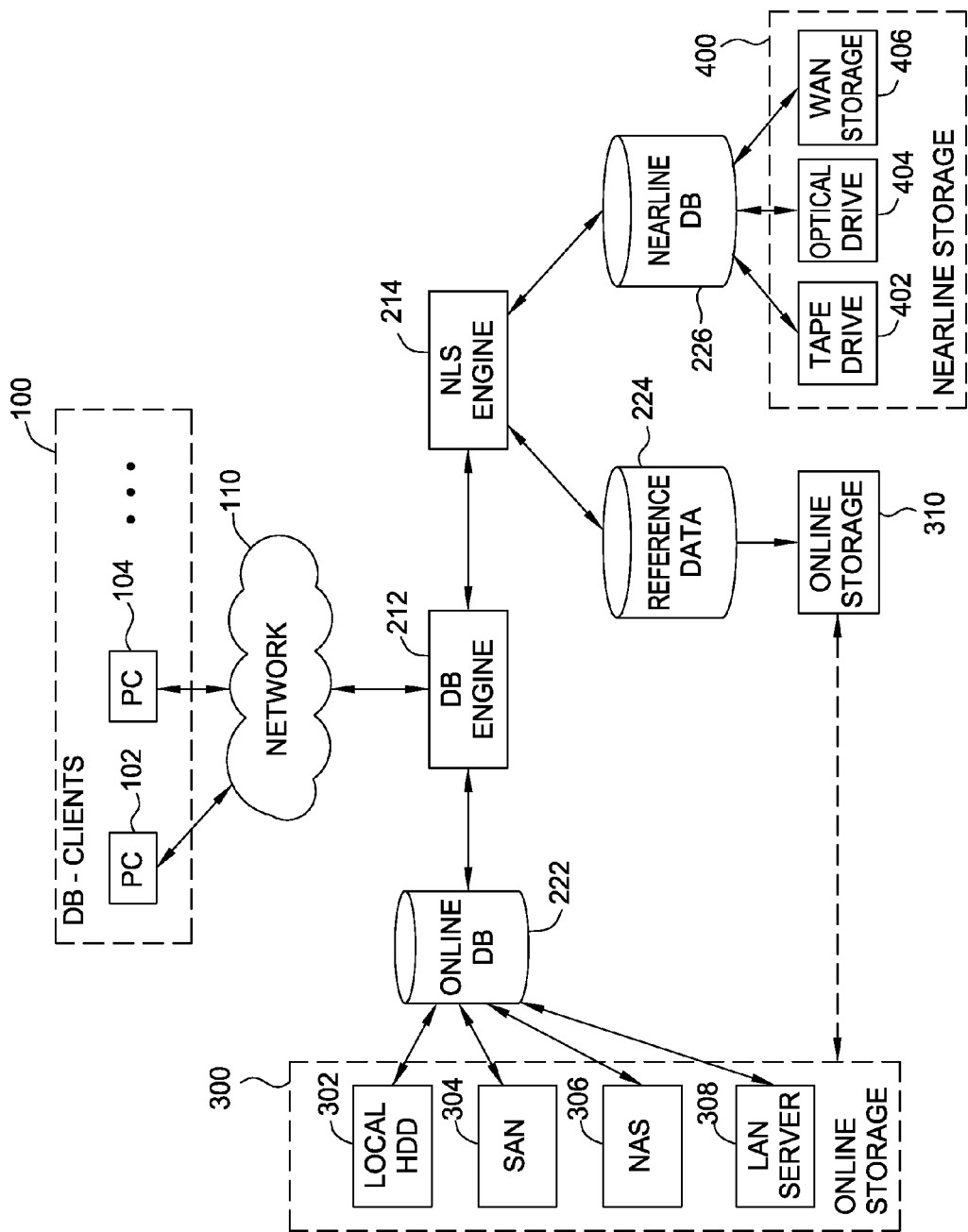
FIG. 1 is a block diagram showing the general architecture of a database management system in accordance with the invention.

Embodiments of the present invention provide techniques for implementing a layer in a database management system (DBMS) that allows transparently storing and accessing data within either an active (online) storage area or a nearline storage area.

Generally, embodiments of the present invention provide techniques for managing access to a table which is stored in a plurality of databases. For example, the table may comprise a plurality of cells being organized in a plurality of columns and a plurality of rows. In this case, a first subset of the rows of the table is stored in a first data table of a first database, e.g., a nearline database, and a second subset of the rows of the table is stored in a second data table of a second database, e.g., an online database.

In various embodiments, reference data, such as a value-existence structure, is used to decide if data is available in the nearline database for a given query. For example, in various embodiments, a value-existence structure is generated for the first subset of rows. Such a value-existence structure may comprise a list of distinct values stored in the nearline database, wherein with each distinct value in the value-existence structure may be associated with a respective indicator identifying the columns in which the distinct value is stored.

In various embodiments, when a database query has been received from a database client, the solution disclosed herein verifies if there exist matching rows in the nearline database and the online database.

In various embodiments, it is verified if the value-existence structure contains the given value. Based on the result, the various embodiments described herein are able to understand if the nearline database has to be accessed or not. For example, if the value-existence structure contains the given value and the respective indicator indicates that the given value is stored in the given column, the matching rows in the nearline database may be retrieved and a query result set may be generated comprising the rows retrieved from the nearline database and the rows retrieved from the online database. Conversely, if the value-existence structure does not contain the given value, the nearline database does not need to be accessed and the query result set may comprise only the rows retrieved from the online database.

The solution may also provide an autonomous database archiving function. For example, in various embodiment, rows in the online database, which have not been accessed over a predetermined time interval, are detected and may be moved to the nearline database. Conversely, rows in the nearline database, which have been accessed, may be moved to the online database. Moreover, in response to a movement of a row from one of the databases to the other database, an update of the value-existence structure may be performed.

Such a solution combines the advantage of a nearline storage architecture with transparency towards business applications, while also saving costs.

Additionally, embodiments disclosed herein may provide seamless integration into existing database management systems, such as a relational database management system (RDBMS). This allows the usage of such a solution without any change to the application using the database. Moreover, providing the functionality directly within the database management system minimizes the additional overhead for administration, education and maintenance.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, the complete database management system may be implemented with the cloud and the user may only send database commands to the cloud.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 shows a block diagram of a database management system according to one embodiment of the invention. As shown, a plurality of database (DB) clients 100, such as personal computers (PC) 102 and 104, are communicating via a communication network 110 with a DB engine 212. For example, the communication network 110 may be any LAN or WAN network. In one embodiment, the DB engine 212 may be a relational database management system (RDBMS), which manages an online database 222.

Additionally, the online database 222 may be stored on an online storage media 300. Generally, the online database 222 may be stored on any sufficiently fast accessible storage media 300. For example, the online storage media 300 may be a Direct-Attached Storage (DAS) media, such as a local Hard Disk Drive (HDD) of the computer running also the DB engine 212. However, the online storage media 300 may also include remote storage media, such as a storage media 304 accessible via a Storage Area Network (SAN), a Network-Attached Storage (NAS) 306, or another file or database server 308 in the same LAN.

In one embodiment, the DB clients 100 are communicating with the DB engine 212 by means of database commands, such as Structured Query Language (SQL) commands. Generally, the database commands may be used for data insert, update, delete and query. As shown, the DB engine 212 is also communicating with a nearline database 226, in which less frequently accessed data is stored. Note, nearline database 226, is used to represent any nearline data storage mechanism, whether or not such data store is denominated as a "database."

The nearline database 226 is stored on a nearline storage media 400, which may have less access speed than the storage media 300. Generally, any local or remote storage media may be used for the storage media 400. For example, the nearline storage media 400 may be a low performance disk array, a tape drive 402, an optical drive 404 or a remote storage media accessible via a network (e.g., WAN) 406.

Those of skill in the art will appreciate that tape drives 402 or optical devices 404 are convenient devices for storing archive data. However, the performance impact of a data read operation, which reads its data from such devices, might be too high for certain applications. Accordingly, in one embodiment, disk storage devices are used for both the online database 222 and the nearline database 226. In such a case, each of the disk storage devices may have different speeds and costs, i.e., the faster device may hold the online data and the slower device may hold the nearline data.

Access to the nearline database 226 is managed by a NLS engine 214. In one embodiment, the NLS engine 214 also manages reference data (e.g., a value-existence structure), which may be used to avoid unnecessary accesses to the nearline DB 226. An important issue for a query running against the data stored in the nearline database 226 is to know very fast whether there are matching rows located in the nearline database 226. Given that the nearline database 226 stores data, which is accessed less frequently, it is expected that for a given query only a small amount of rows, if any, will be read from the nearline database 226, while most (or all) of the rows will be retrieved from the online database 222.

For example, in a typical application a majority of the queries may build a result set from data stored in the online database 222, while only 1% of the queries may fetch also data from the nearline database 226. So only a fraction of the workload will actually retrieve data from the nearline database 226. On the other hand, the whole response time of a query is directly influenced by the time taken to evaluate whether the nearline database 226 contains rows matching the query's conditions or not, because a query is not completed until both the online and the nearline databases provide their data.

Accordingly, in an embodiment, the NLS engine 214 uses reference data 224, which permits that enables an a NLS lookup to respond very fast in case there are no matching rows in the nearline database 226. In one embodiment, the reference data 224 is stored on an online storage media 310. In this context, online storage media 310 means a storage media permitting faster access than that of nearline storage media 400, so that the NLS engine 214 may access the reference data 224 faster than the nearline database 226. Generally, any of the previously described online storage media 300 may be used also for the online storage media 310. For example, in one embodiment, the DB engine 212 and the NLS engine 214 may run on the same computing system in the form of software applications and the online database 222 and the reference data 224 may be stored on the same online storage media.

Figure 2:
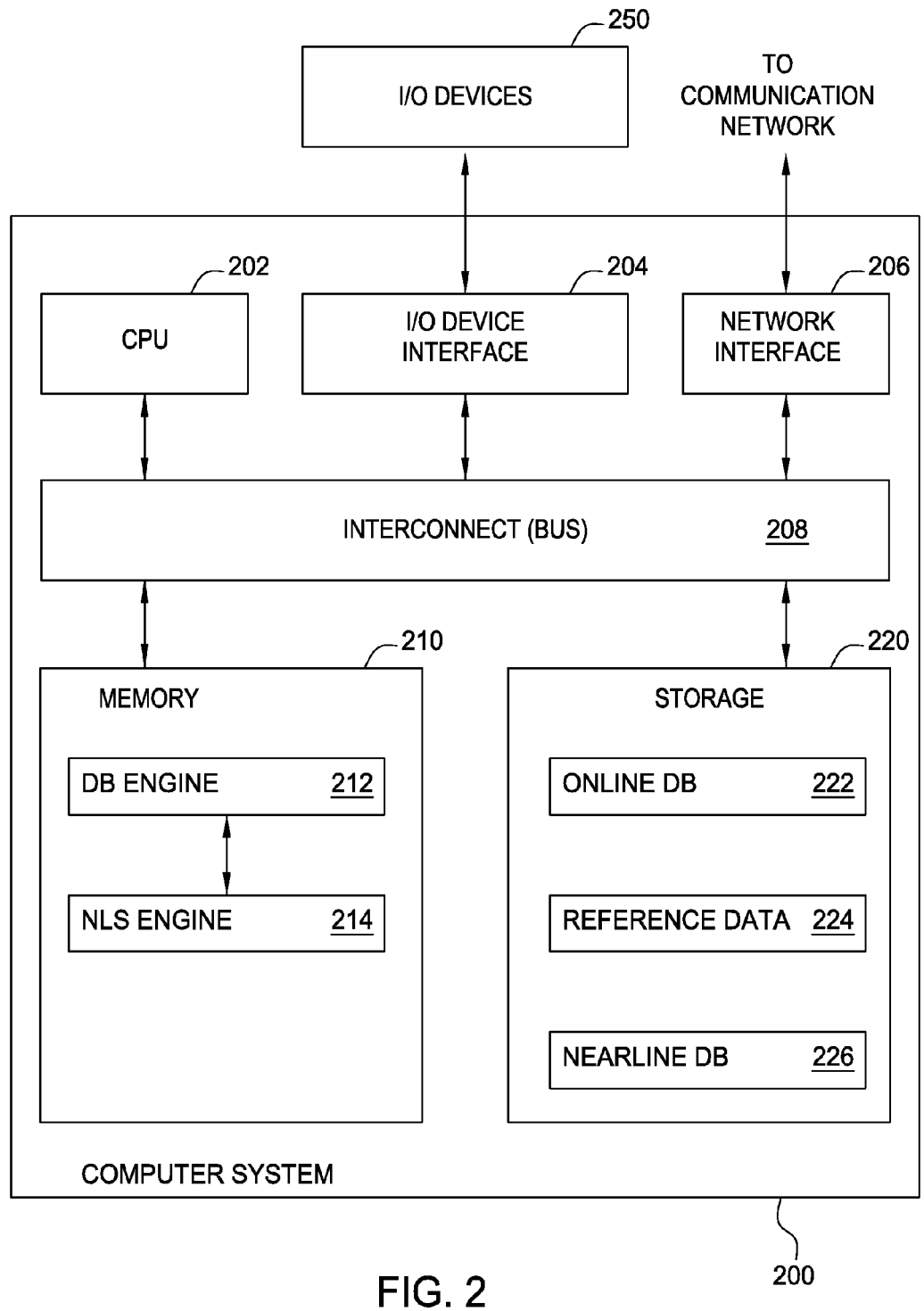
FIG. 2 is a block diagram of a computing system implementing the database management system of FIG. 1, according to one embodiment of the invention.

FIG. 2 shows an embodiment of a computing system 200 implementing the main blocks of the database management system of FIG. 1. As shown, the computing system 200 includes, without limitation, a central processing unit (CPU) 202, a network interface 206, an interconnect 208, a memory 210, and storage 220. The computing system 200 may also include an I/O device interface 204 connecting I/O devices 250 (e.g., keyboard, display and mouse devices) to the computing system 200.

The CPU 202 retrieves and executes programming instructions stored in the memory 210. Similarly, the CPU 202 stores and retrieves application data residing in the memory 210. The interconnect 208 is used to transmit programming instructions and application data between the CPU 202, I/O devices interface 204, storage 220, network interface 206, and memory 210. CPU 202 is included to be representative of a single CPU, multiple CPUs, a single CPU having multiple processing cores, and the like. And the memory 210 is generally included to be representative of a random access memory. Illustratively, the memory 210 includes a DB engine 212 and a NLS engine 214. As noted above, the DB engine 212 provides a software application which manages access to an online DB 222 and a nearline DB 226, while the NLS engine 214 provides a software application which optimizes the access speed to the nearline DB 226 by means of reference data 224. Of course, one of ordinary skill in the art will recognize that the functionality provided by the components of the DB engine 212 and the NLS engine 214 could be implemented in a variety of ways other than as shown in FIG. 2. Further, the functionality of these components could be distributed across multiple computing systems, e.g., using a variety of available database-services or other distributed computing frameworks.

In this example, the storage 220 includes the online DB 222, the reference data 224 and the nearline DB 226. As mentioned above, although shown as a single unit, the storage 220 may be a combination of fixed and/or removable storage devices, such as fixed disc drives, floppy disc drives, tape drives, removable memory cards, optical storage, network attached storage (NAS), or a storage area-network (SAN). For example, the online DB 222 and the reference data 224 may be stored on a local high-performance disk array, while the nearline DB 226 may be stored on a low cost NAS.

Figure 5:
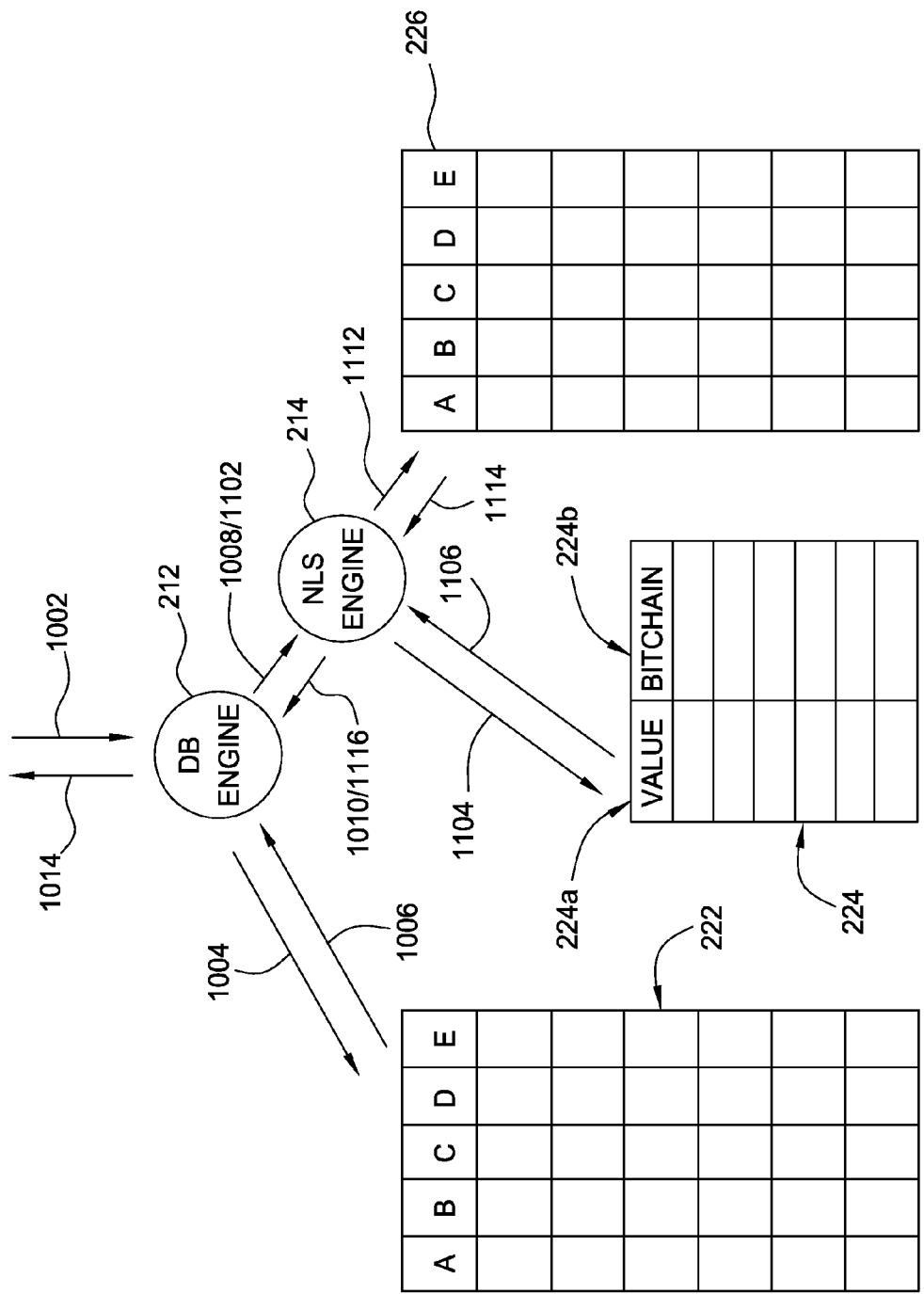

FIG. 5 schematically shows a set of exemplary structures of the online DB 222 and the nearline DB 226. As shown in FIG. 5, the online DB 222 and the nearline DB 226 each include at least one table, which has the same data columns. In this specific example, both databases include a table which includes the columns A, B, C, D and E. Those of skilled in the art will appreciate that each of the databases 222 and 226 may also include further columns, which may be used for storing system data and which may thus not be mirrored in both databases 222 and 226. Moreover, the online database 222 may also include tables which are not selected for archiving and are thus not mirrored at all in the nearline DB 226.

Figure 3:
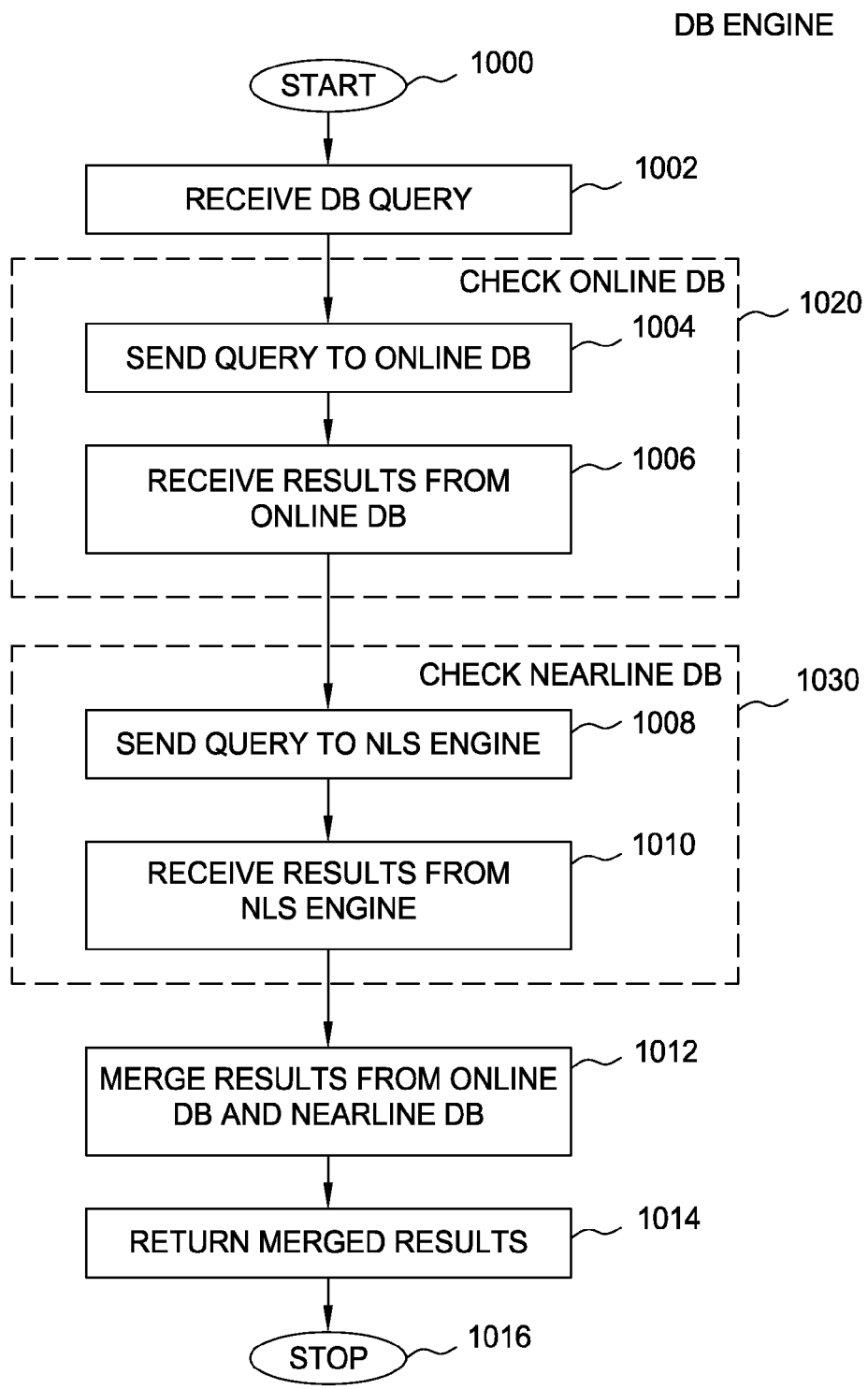
FIGS. 3 and 4 are flowcharts showing exemplary embodiments of the database management system of FIG. 1.

FIG. 3 illustrates a flowchart of operations performed by the DB engine 212, according to one embodiment of the invention. As shown, following a start step 1000, the DB engine 212 receives at a step 1002 a database query from one of the database clients 100. At step 1020, the DB engine 212 runs the database query against the online database 222. For example, in case the online database is managed on a different server or by means of another software module, the step 1020 may include step 1004, in which the DB engine 212 sends the initial database query to the online database 222 and step 1006 in which the DB engine 212 receives the respective query result from the online database 222.

Similarly, at step 1030, the DB engine 212 runs the same database query against the nearline database 222. For example, at step 1008 the DB engine 212 sends the initial database query to the NLS engine 214 and step 1010 in which the DB engine 212 receives the respective query result from the NLS engine 214. Those of skill in the art will appreciate that the DB engine 212 may perform the steps 1020 and 1030 also in reverse order, or also concurrently.

Once the DB engine 212 obtains the results of the queries from the online database 222 and the nearline database 226, the DB engine 214 may merge the results at a step 1012 and return the merged results to the database client at a step 1014. The procedure terminates at step 1016.

Figure 4:
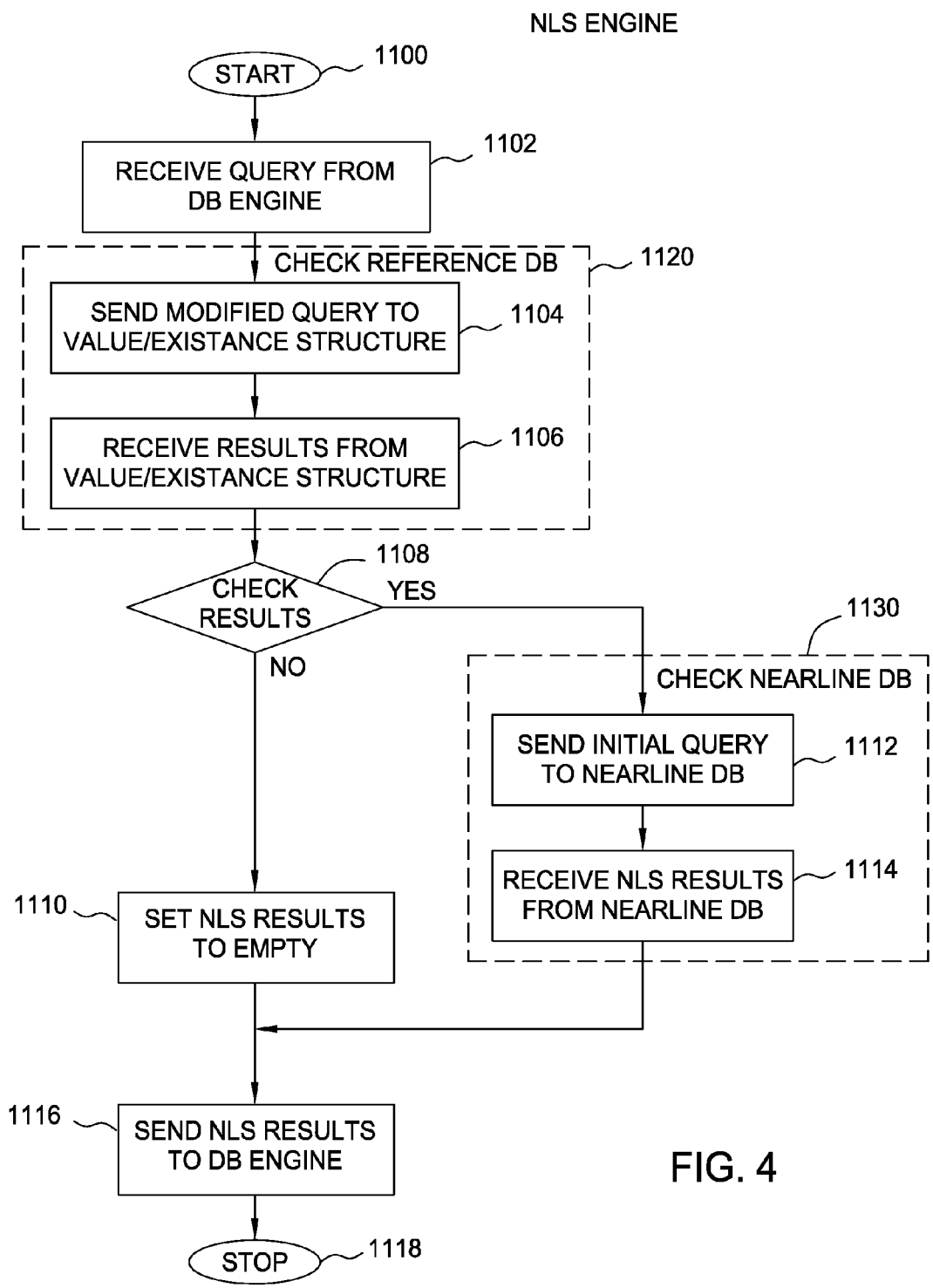

FIG. 4 illustrates an example of how the NLS engine 214 may run a database query against the nearline database 226, according to one embodiment of the invention. Following a start step 1100, the NLS engine 214 receives the database query sent by the DB engine (step 1102). At step 1120, the NLS engine 214 responsively runs a modified query against the reference data 224. For example, in case the reference data 224 is stored in a reference database, the step 1120 may include a step 1104, in which the NLS engine 214 sends a modified database query to the reference data 224 and a step 1106 in which the NLS engine 212 receives the respective query result from the reference data 224.

In one embodiment, the reference data 224 includes a value-existence structure. Such a value-existence structure can be implemented in various ways. For example, each data record of the value-existence structure, i.e., each combination of data items, may be stored in a respective row of the value-existence table. Further, the value-existence table may be stored in the online DB 222 in the form of an additional table, e.g., in the database catalog or a user table. However, the value-existence table may also be stored in a different database. Looking at the performance requirements of such a structure, it is also possible to implement the value-existence structure as part of a table header that is loaded into memory if required.

In one embodiment, the value-existence structure may be implemented as a distinct memory structure, such as a data array, which is independent from the online and nearline databases and can also be implemented in a compressed format. Of course, one of ordinary skill in the art will also appreciate that the reference data 224 may also be stored only temporarily in the memory of the computer system running the NLS engine 214. For example, the NLS engine 214 may access the NLS database and reconstruct these reference data 224 at each startup.

FIG. 5 shows an example of a value-existence structure of reference data 224 being stored in the form of a value-existence table, according to one embodiment of the invention. As shown, the value-existence table comprises two columns 224a and 224b. The first column 224a stores a list, wherein for each distinct value of the table in the nearline DB 226, the value is also stored in its own individual row in column 224a. The second column 224b is a bitchain, whose length is defined by the number of columns in the original table. In one embodiment, column 224b is used to mark the position where a respective value occurs. Accordingly, such a value-existence table enables a quick query result for determining whether a certain value exists in a given column of nearline DB 226 (and thus whether the nearline DB 226 has any records that may need to be evaluated for a given query of databases 222 and 226).

FIGS. 6 and 7 show an example table in the nearline database 226 and the respective value existence structure, according to one embodiment of the invention. As shown, the example nearline database 226 table is a table STAFF, which has four columns EMPID, DEPT, JOB and YEARS. In this example, the column 224b of the reference data 224 includes a sequence of four bits, i.e., one bit for each column of the corresponding STAFF table in nearline database 226. In one embodiment, there is one table in the reference data 224 for each table in the nearline DB 226. This arrangement may simplify the storage of value-existence data (i.e., reference data 224) as bitchains.

For example, the value "10" in the first row of the reference data 224 indicates that the value "10" exists in nearline DB 226, and bitchain "1101" in the same row of the second column 224b indicates the columns in which the value "10" exists in nearline DB 226. That is, the 1's in the first, second and fourth bits of "1101" of the first row indicate the row's value "10" exists only in the first, the second and the fourth column of the STAFF table of the nearline database 226. Similarly, the combination of value "100" and bitchain "1000" in the second row of the reference data 224 indicates that the value "100" only exists in the first column of the STAFF table of the nearline database 226.

As mentioned, such a value-existence structure permits efficient detection of matching rows in the nearline database 226 for a given query. For example, in an embodiment, responsive to an original query of databases 222 and 226, NLS engine 214 determines whether to search database 226 by searching reference data 224, beginning with a modified query of the first column 224a, searching for values matching the condition of the original query. If a match is found for the modified query is found in column 224a, then, for the matching row, NLS engine 214 looks in the second column 224b of reference data 224, i.e., the bitchain component, to determine which columns of DB 226 contain the matching value. If any value is found in a row of column 224a, but it is not located in the proper bit position of the bitchain in column 224b for that row, this means that no row in the nearline database 226 matches the query conditions and therefore DB 226 itself does not need to be searched, i.e., the original query will not retrieve any rows from DB 226. That is, the final result of the original query of databases 222 and 226 will return only rows from the table in the online database 222.

For example, consider the case in which the NLS engine 214 receives at the step 1102 the following SQL query from the DB engine 212:

```
SELECT
    *
FROM
    STAFF
WHERE
    DEPT = 10 AND YEARS = 5
```

In the embodiment considered, since the DEPT column in the STAFF table of nearline DB 226 is represented by the second bit of the bitchain in reference DB 224 and the YEARS column in the STAFF table is represented by the fourth bit of the bitchain, the NLS engine 214 runs at step 1120 the following exemplary logical expression as a modified query against the reference DB 224:

```
(
    EXISTS VALUE = 10 AND
    EXISTS VALUE = 5
) AND (
    BITCHAIN [ 2 ] = 1 for VALUE = 10 AND
    BITCHAIN [ 4 ] = 1 for VALUE = 5
)
```

By combining every condition of the logical expression by an AND operator, it can be concluded, that as soon as one of the condition brings a false result, the search can be stopped and the NLS engine 214 can return an empty result.

For the tables shown in FIGS. 6 and 7, the condition "EXISTS VALUE=10" would be true, because the value "10" is present in the first row of column 224a, and the respective bitchain in column 224b would indicate that the value "10" is listed in the first, second and third column of the STAFF table in the nearline database 226. Similarly, the condition "EXISTS VALUE=5" would be true, because the value "5" is present in the seventh row of column 224a, and the respective bitchain in column 224b would indicate that the value "5" is listed in the second and fourth column of the STAFF table in the nearline database 226. Also the conditions "BITCHAIN [2]=1 for VALUE=10" and "BITCHAIN [4]=1 for VALUE=5" would be true, because as already indicated in the foregoing the second bit of the bitchain is ON for the value "10" and the fourth bit of the bitchain is ON for the value "5." Accordingly, the overall result of the verification of the logical expression against the reference DB 224 would be true, i.e., the result of the modified database query at the step 1120 would be true.

The NLS engine 214 may verify at step 1108 the result of the modified database query. For example, given the positive result of the modified query, the NLS engine 214 would determine that rows exist in the nearline database 226 which match the query condition.

Accordingly, when the verification at step 1108 is positive, the NLS engine may run the initial database query received at the step 1102 against the nearline database 226 (step 1130) and retrieve the corresponding rows from the nearline database 226. For example, in case the nearline database is managed on a different server or by means of a different software module, the step 1130 may include a step 1112, in which the NLS engine 214 sends the initial SQL database query to the nearline database 226 and a step 1114 in which the NLS engine 212 receives the respective query result from the nearline database 226.

Conversely, consider the case in which the NLS engine 214 receives at the step 1102 the following SQL query from the DB engine 212:

```
SELECT
    *
FROM
    STAFF
WHERE
    DEPT = 20 AND YEARS = 2
```

In this example, the NLS engine 214 could thus run the following exemplary logical expression against the reference data 224:

```
(
    EXISTS VALUE = 20 AND
    EXISTS VALUE = 2
) AND (
    BITCHAIN [ 2 ] = 1 for VALUE = 20 AND
    BITCHAIN [ 4 ] = 1 for VALUE = 2
)
```

For the tables shown in FIGS. 6 and 7, the condition "EXISTS VALUE=20" would be true, because the value "20" is present in the fourth row of column 224a, and the respective bitchain in column 224b would indicate that the value "20" is listed in the first and second column of the STAFF table in the nearline database 226. Conversely, the condition "EXISTS VALUE=2" would be false, because the column 224a does not contain the value "2." Accordingly, the verification of the logical expression against the reference DB 224 may be stopped and the overall result of the verification would be false. That is, the result of the modified database query at the step 1120 would be false.

Again, the NLS engine 214 may verify the result of the modified database query. For example, given the negative result of the modified query, the NLS engine 214 would determine that no rows exist in the nearline database 226 which match the query condition. Accordingly, when the verification at the step 1108 is negative, i.e., branch "NO" of the verification 1108, the NLS engine may communicate to the DB engine that no matches exist in the nearline database 226. For example, the NLS engine may set at a step 1110 the result of the NLS query to empty.

Before the procedure terminates at a step 1118, the NLS engine 214 may send the result of the NLS query to the DB engine 214 (step 1116). That is, either an empty query result is returned (step 1110) or the results of the NLS database query is returned (step 1130).

Note, the values in the column 224a may be limited only to searchable items in the nearline database 226, such as the items of columns comprising strings or numbers. Moreover, columns of the nearline database 226 comprise binary data or less frequently accessed columns may be excluded and accordingly also the length of the bitchain in the column 224b may be a reduced.

For example, in one embodiment, the database administrator may select during setup only a given number of columns which are used for generating the value-existence structure. In this way, the database administrator may limit the columns to those commonly queried. In case the NLS engine 214 receives a query for a column not stored in the value-existence structure, the NLS engine 214 could still access the nearline database 226 and check if the respective column contains the requested value.

Those of skill in the art will also appreciate that the second column 224b, i.e., the bitchain, is optional. Generally any other suitable "column-indicator" identifying the columns in which a respective value is stored may be used for this scope. For example, if each column contains a different data type, such as string, real, integer, etc., the NLS engine 214 may immediately understand in which column a specific value may be found. In this case, the data type of the value itself may operate as column-indicator. In case the table contains only one column, no additional column-indicator would be required.

Those of skill in the art will also appreciate that the NLS engine 214 may also be implemented directly within the DB engine 212. In this case, it might also be unnecessary to explicitly exchange messages between the DB engine 212 and the NLS engine 214. Accordingly, the steps 1008, 1010, 1102 and 1116 are optional and the steps 1104 to 1114 of FIG. 5 could also be executed directly at the step 1030 of FIG. 3.

The DB engine 212 could also be implemented as a dedicated computer program, which may be installed in an already existing database environment. In this case, the DB engine 212 could operate as an additional layer between the database clients 100 and the previously existing database, which would thus become the online database 222. In this case, the NLS engine 214 and the nearline database 226 could be installed on the existing database server or on a completely different computing system.

In one embodiment, the DB engine 214 decides whether a row has to be moved from a table in the online database 222 to the corresponding table in the NLS database 226. For example, in an embodiment the DB engine 214 determines autonomously if a row has not been accessed over a predetermined period of time. Further, the value-existence table is updated when a row is moved from the online DB 222 to the nearline DB 226. For example, such an update may be performed by evaluating the content of the row and setting the respective bits in the bitchain 224b for the corresponding values 224a in the value-existence table 224. For example, an archive flag may be associated with each row of a table, wherein the archive flag, such as a single bit value or a count value, which may identify a row as a potential candidate for archiving.

Figure 8:
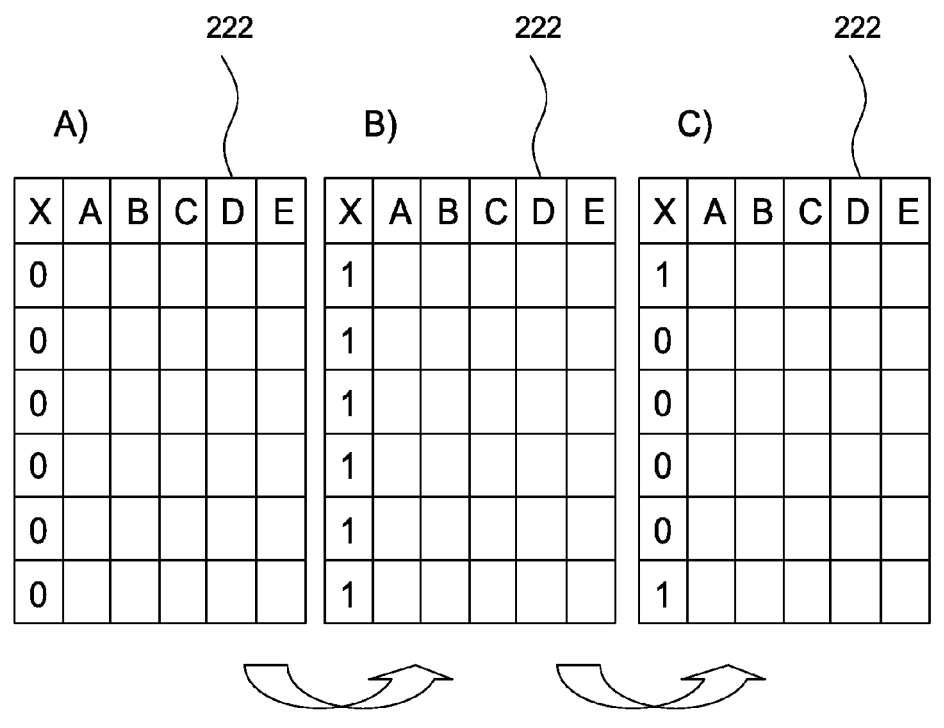

FIG. 8 shows an example in which an additional column x has been added to a table in the online DB 222. Specifically, this column x may be used to store for each row the respective archive flag. As shown in FIG. 8a, an initial state in which all archive flags x are set to 0. A scheduler may then increment the flag of each row after a predetermined period of time. This result is shown in FIG. 8b. If a row is fetched by a query or accessed, the flag may be reset. For example FIG. 8c shows an example in which the second, third, fourth and fifth row of the table had been accessed and accordingly the respective archive flags x have been reset to 0.

Figure 9:
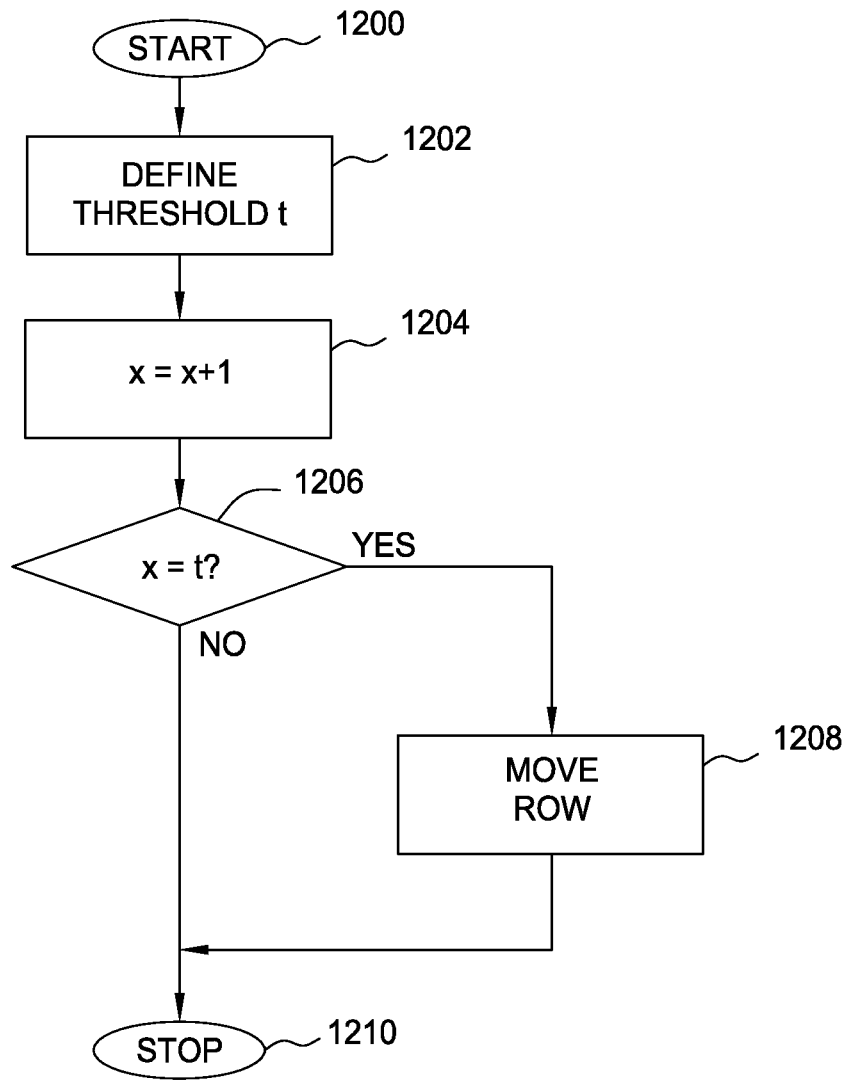

FIG. 9 illustrates a flowchart for an archiving mechanism which may be implemented within the DB engine 212, according to one embodiment of the invention. Specifically, FIG. 9 shows the steps which should be repeated for each row in a table with records which may be moved to the nearline storage DB. Following a start step 1200, the procedure is initialized at step 1202. For example, this may include defining a threshold value t, which identifies the period after which a row that has not been accessed should be moved from the online database 222 to the nearline database 226.

At step 1204, the content of an archive flag x is incremented for the respective row in the table. And at step 1206, the archive flag x is compared with the previously define threshold value t. If the archive flag is smaller than the threshold t, i.e., output "NO" at step 1206, the respective row is not moved to the nearline database 226. Consequently the procedure may terminate at step 1210 and perform the iteration for the next row. Conversely, if the archive flag is equal to or greater than the threshold t, i.e., output "YES" at step 1206, the respective row is moved to the nearline database 224 at step 1208. Also in this case, the procedure may terminate at step 1210 and a new iteration may be performed for the next row. The scheduler will continue to increase the value for the archive flag until a defined threshold is reached. If the threshold is reached, the row will be moved from the online DB 222 to the nearline database 226 and appropriate entries in the value-existence structure may be generated.

An important aspect of the scheduling procedure is its performance. Therefore, the following considerations should be properly addressed. The scheduling procedure is based on the existence of the archive flag in the table. This flag is reset or updated each time the row is part of the result set of a query which could have an impact on the performance. For example, to minimize the performance impact, the values for the archive flag may be limited to 0-7 and thus only a single byte may be needed to provide the required functionality. Those of skill in the art will appreciate that the archive flag may be implemented as flag in the table but can also be stored for performance and concurrency reasons in a dedicated memory area as statistical information.

The archive flag information is neither required by the application nor for the operation of the database. For example, the archive flag may also be stored temporarily in a memory structure identifying the table object and the row id, because even loosing this information will not affect data integrity. Accordingly, the archive flag may also be lost when the database is shut down and a new archiving detection cycle could be started again after the database is online. To allow an archiving detection over a longer period of time, the archive flags should be stored on some kind of storage media. For the same reasons, the update of this flag does not need to be done synchronously when the row is part of the result set. For example, the information about the reset operation can be temporarily stored in a memory structure. Accordingly, the subsequent update may be performed asynchronously.

In one embodiment, the scheduling frequency and/or the threshold t may be adjusted. For example, respective values may also be specified for each table and accordingly different archiving strategies are possible even if a database wide scheduling frequency has been enabled. Further, the scheduler may also be used to move data back from the nearline DB 226 to the online DB 222. For example, a row may be moved back from the nearline database 226 to the online database 222 if the respective row has been accessed. In such a case, a flag, such as a single bit or a count value and a timer may be used to determine if a row has been accessed at least a given number of times over a predetermined time period. Accordingly, those of skill in the art will appreciate that these scheduling parameters should be tuned to the specific application requirements in order to avoid unnecessary movements between the online DB 222 and the nearline DB 226. In one embodiment, the movement of the rows from the nearline DB 226 back to the online DB 222 not only transfers those rows to the corresponding table in the online database 222 but also triggers an internal synchronous or asynchronous task to update the value-existence structure.

Figure 10:
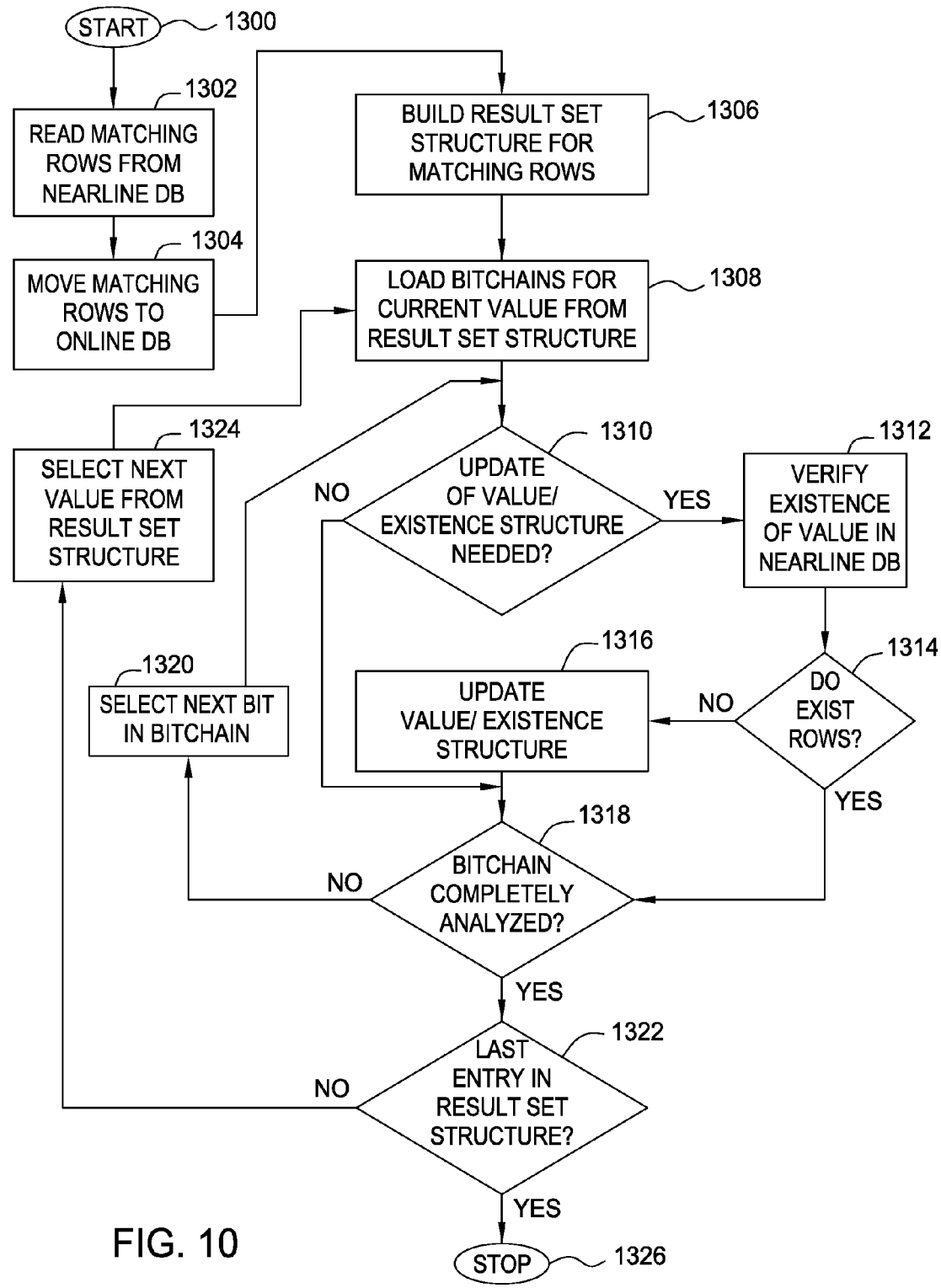

FIG. 10 illustrates a flowchart of an embodiment of such an update procedure. Specifically, in the embodiment considered, the bits in the various bitchains of the corresponding value in the result-set structure are verified separately in order to determine if a further database query has to be run and if the respective bit in the bitchain 224*b* of the value-existence structure should be reset.

Following start step 1300, rows in the nearline DB 226 which matched a database query are read from the nearline DB 226 (step 1302) and are moved to the online DB 222 (step 1304). At step 1306, the matching rows are internally decomposed in their different columns and a volatile result-set structure similar to the already existing value-existence structure is built. This result-set structure may then be used to identify which queries should be run on the nearline DB 226 and which entries in the bitchain 224*b* of the value-existence structure should be reset.

At step 1308, the bitchain for the first value in the result-set structure is loaded from the result-set structure and the first bit value of the bitchain is selected as current bit value, which identifies a corresponding column in the nearline DB 226. At step 1310, this current bit value is controlled in order to determine if an update of the value-existence structure might be needed. For example, if the current bit value of the result-set structure is set to "0" for the current value, the current value has not been removed from the corresponding column of the nearline DB 226. Accordingly, in case the verification at step 1310 provides a negative result, i.e., output "NO" at step 1310, it is not necessary to perform any further verification on the nearline DB 226 and the procedure may check the next bit. Conversely, if the current bit value of the result-set structure is set to "1" for the current value, the current value has been removed from the corresponding column of the nearline DB 226 and accordingly it is necessary to verify if the current value still exists in corresponding column of the nearline DB 226.

In one embodiment, the result of the verification may also be compared with the value-existence structure in order to determine if the results are congruent. For example, an error message may be generated if a bit in the bitchain is set to "1" in the result-set structure, while the respective bit would be set to "0" in the value-existence structure. In fact, this would mean that according to the value-existence structure the value would not exist for the respective column. Accordingly, in case the verification (at step 1310) provides a positive result, i.e., output "YES," the procedure runs a database query at step 1312 to verify the existence of the current value in the column of the nearline DB 226 which corresponds to the currently selected bit. For example, in an embodiment, the following SQL query may be run to check if there exist still entries of a given value in a given column <column_n> of a given table <table>:

```
SELECT
    1
FROM
    <table>
WHERE
    <column_n> = value
FETCH FIRST 1 ROW ONLY OPTIMIZE FOR 1 ROW
```

Those of skill in the art will appreciate, that the above shown SQL query verifies only the existence of the first occurrence of a value in the column. However, this is sufficient, because the current bit should be reset only if no further entry exists in nearline DB. Accordingly, once the database query of step 1312 has been run, the query result may be verified at step 1314. For example, in case there do exist rows, which contain the current value in the column corresponding to the currently selected bit, i.e., output "YES" at step 1314, no update is required and the procedure may check the next bit. Conversely, in case there do not exist any further rows, which contain the current value in the column corresponding to the currently selected bit, i.e., output "NO" at step 1314, the procedure updates the value-existence structure at step 1316. For example, step 1316 may include resetting the corresponding bit in the value-existence table and removing the complete row from the value-existence structure if all bits of the bitchain are set to "0."

Once the various processing steps 1310 to 1316 have been performed for the current bit, the procedure may verify at step 1318 whether the bitchain has been completely analyzed. For example, in case there are still further bits in the current bitchain, i.e., output "NO" at step 1318, the next bit in the bitchain may be selected as current bit at step 1320 and the procedure may verify the next bit starting from the step 1310. Conversely, in case there are no further bits in the current bitchain, i.e., output "YES" at step 1318, the next value in the result-set structure may be verified. For example, the procedure may verify for this purpose at step 1322 if there are still entries in the result set structure and if the last entry has been reached, i.e., output "YES" at step 1322, the procedure may terminate at a stop step 1326.

In case there are still entries in the result set structure, i.e., output "NO" at step 1322, the procedure may select the next value in the result-set structure as current value at step 1324 and the respective bitchain may be verified starting from step 1308.

Those of skill in the art will appreciate that, even in the absence of any update of the value-existence structure after a movement of a row from the nearline DB 226 to the online DB 222, the rows returned by a query run against the nearline DB 226 are always correct. But, the update of the value-existence structure may help avoid unnecessary look ups into the NLS archive.

For example, in an embodiment, these subsequent look ups of entries in the actual NLS database 226, which do not provide any results, because the respective entries have already been restored, may be used to reset the respective bit in the bitchain or to remove the complete row from the value-existence structure. Moreover, the update of the value-existence structure could also be done periodically by re-analyzing the content of the nearline DB 226.

As mentioned above, various embodiments described herein can be used to provide transparent access to the data as it is still stored in one relational table. However, it is possible to extend various functionalities within the database to further optimize the solution. For example, data retrieval can be enhanced to handle tables in the nearline DB in a special way. For example, in one embodiment, a new clause to the SQL SELECT statement is supported, which can used to specify the source of information.

```
SELECT
    *
FROM
    STAFF ACTIVE ONLY
WHERE
    DEPT = 20 AND YEARS = 2
```

Accordingly, the clause "ACTIVE ONLY" could be used to retrieve the data only form the online DB 222, knowing that the result set may not be complete.

Database maintenance operations may be also enhanced. For example, the database could support a substantially similar option "ACTIVE ONLY" also for other operation, such as reorganization of tables, generation of statistics or backups. Those of skill in the art will appreciate that the value-existence structure does not replace and may not be replaced by the functionality provided by indexes created on a table. In fact, such indexes are created to achieve better performance for queries recovering data from the table. For example, during the creation of an index, the database administrator may identify a set of columns used to create the index, so after the index creation for every combination of values for these columns a reference to data rows is stored. Conversely, the value-existence structure does not provide any reference to the data rows, but to columns. In fact, the value-existence structure helps to decide whether data matching a query conditions is available from the nearline layer or not. For the same reasons, the value-existence structure can also be combined with such indexing functionality. For example, after the database manager system (DBMS) has used the value-existence structure to identify that at least one row matches a given query condition, any of the indexes created on the table can be used to find quickly the corresponding data rows and build the query result set.

While the foregoing is directed to embodiments of the present invention, other and further embodiments of the invention may be devised without departing from the basic scope thereof, and the scope thereof is determined by the claims that follow.

What is claimed is:

1. A computer implemented method of managing access to rows of a database table, the method comprising:
   receiving a database query from a database client, the database query comprising a command to search for rows of the database table containing a given value in a given column, wherein the rows of the database table are stored in a first data table on a first storage media and a second data table on a second storage media, wherein the first storage media has a lower access speed than the second storage media;
   determining whether a value-existence structure contains the given value, the value-existence structure comprising a list of distinct values in the given column stored in the first data table,
   upon determining the value-existence structure contains the given value retrieving from the first data table the rows containing the given value and transmitting the rows of the first data table to the database client; and
   retrieving from the second data table any rows containing the given value in the given column and transmitting any retrieved rows of the second data table to the database client.

2. The method of claim 1, further comprising:
   upon determining the value-existence structure does not contain the given value, transmitting an indication that there do not exist rows in the first data table containing the given value in the given column.

3. The method of claim 1, further comprising
   generating the value-existence structure for the first data table by analyzing the content of the first data table.

4. The method of claim 1, wherein the indicator identifying the columns in which a distinct value is stored is a bitchain, wherein a bit is associated with each column in the first data table, wherein a bit in the bitchain is set to a first logic value if the respective column contains the distinct value, and wherein a bit in the bitchain is set to a second logic value if the respective column does not contain the distinct value.

5. The method of claim 1, further comprising:
detecting rows in the second data table, which have not been accessed over a predetermined time interval;
moving the detected rows from the second data table to the first data table; and
updating the value-existence structure, if a row has been moved from the second data table to the first data table.

6. The method of claim 1, comprising:
detecting rows in the first data table, which have been accessed;
moving the accessed rows from the first data table to the second data table; and
updating the value-existence structure, if a row has been moved from the first data table to the second data table.

7. A non-transitory computer readable storage medium storing a program, which, when executed on a processor, performs an operation for managing access to rows of a database table, the operation comprising:
receiving a database query from a database client, the database query comprising a command to search for rows of the database table containing a given value in a given column, wherein the rows of the database table are stored in a first data table on a first storage media and a second data table on a second storage media, wherein the first storage media has a lower access speed than the second storage media;
determining whether a value-existence structure contains the given value, the value-existence structure comprising a list of distinct values in the given column stored in the first data table,
upon determining the value-existence structure contains the given value retrieving from the first data table the rows containing the given value and transmitting the rows of the first data table to the database client; and
retrieving from the second data table any rows containing the given value in the given column and transmitting any retrieved rows of the second data table to the database client.

8. The computer readable storage device of claim 7, wherein the operation further comprises:
upon determining the value-existence structure does not contain the given value, transmitting an indication that there do not exist rows in the first data table containing the given value in the given column.

9. The computer readable storage device of claim 7, wherein the operation further comprises:
generating the value-existence structure for the first data table by analyzing the content of the first data table.

10. The computer readable storage device of claim 7, wherein the indicator identifying the columns in which a distinct value is stored is a bitchain, wherein a bit is associated with each column in the first data table, wherein a bit in the bitchain is set to a first logic value if the respective column contains the distinct value, and wherein a bit in the bitchain is set to a second logic value if the respective column does not contain the distinct value.

11. The computer readable storage device of claim 7, wherein the operation further comprises:
detecting rows in the second data table, which have not been accessed over a predetermined time interval;
moving the detected rows from the second data table to the first data table; and
updating the value-existence structure, if a row has been moved from the second data table to the first data table.

12. The computer readable storage device of claim 7, wherein the operation further comprises:
detecting rows in the first data table, which have been accessed; and
moving the accessed rows from the first data table to the second data table; and
updating the value-existence structure, if a row has been moved from the first data table to the second data table.

13. A system, comprising:
a processor; and
a memory storing a database management system tool for managing access to a first data table, which when executed on the processor is configured to perform an operation, comprising:
receiving a database query from a database client, the database query comprising a command to search for rows of the database table containing a given value in a given column, wherein the rows of the database table are stored in a first data table on a first storage media and a second data table on a second storage media, wherein the first storage media has a lower access speed than the second storage media,
determining whether a value-existence structure contains the given value, the value-existence structure comprising a list of distinct values in the given column stored in the first data table,
upon determining the value-existence structure contains the given value retrieving from the first data table the rows containing the given value and transmitting the rows of the first data table to the database client, and
retrieving from the second data table any rows containing the given value in the given column and transmitting any retrieved rows of the second data table to the database client.

14. The system of claim 13, wherein the operation further comprises:
upon determining the value-existence structure does not contain the given value, transmitting an indication that there do not exist rows in the first data table containing the given value in the given column.

15. The system of claim 13, wherein the operation further comprises:
generating the value-existence structure for the first data table by analyzing the content of the first data table.

16. The system of claim 13, wherein the indicator identifying the columns in which a distinct value is stored is a bitchain, wherein a bit is associated with each column in the first data table, wherein a bit in the bitchain is set to a first logic value if the respective column contains the distinct value, and wherein a bit in the bitchain is set to a second logic value if the respective column does not contain the distinct value.

17. The system of claim 13, wherein the operation further comprises:
detecting rows in the second data table, which have not been accessed over a predetermined time interval;
moving the detected rows from the second data table to the first data table; and
updating the value-existence structure, if a row has been moved from the second data table to the first data table.

18. The system of claim 13, wherein the operation further comprises:
detecting rows in the first data table, which have been accessed; and
moving the accessed rows from the first data table to the second data table; and updating the value-existence structure, if a row has been moved from the first data table to the second data table.

* * * * *